D. A. KENNEDY.
Bakers' Oven.

No. 92,840. Patented July 20, 1869.

Witnesses

Inventor
D. A. Kennedy
per Attorneys

United States Patent Office.

D. A. KENNEDY, OF DARIEN, WISCONSIN, ASSIGNOR TO HIMSELF, WILLIAM WADSWORTH, AND E. D. MURRAY, OF SAME PLACE.

Letters Patent No. 92,840, dated July 20, 1869.

IMPROVEMENT IN ROTARY OVENS.

The Schedule referred to in these Letters Patent and making part of the same.

*To all whom it may concern:*

Be it known that I, D. A. KENNEDY, of Darien, in the county of Walworth, and State of Wisconsin, have invented a new and improved Rotary Oven; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish a simple, convenient, and effective oven, which shall be so constructed and arranged as to do its work better and with less expenditure of fuel than the ovens constructed in the ordinary manner; and It consists in the construction and combination of various parts of the oven, as hereinafter more fully described.

A is the wall of the oven, which is made of brick, and circular in form.

Figure 1:
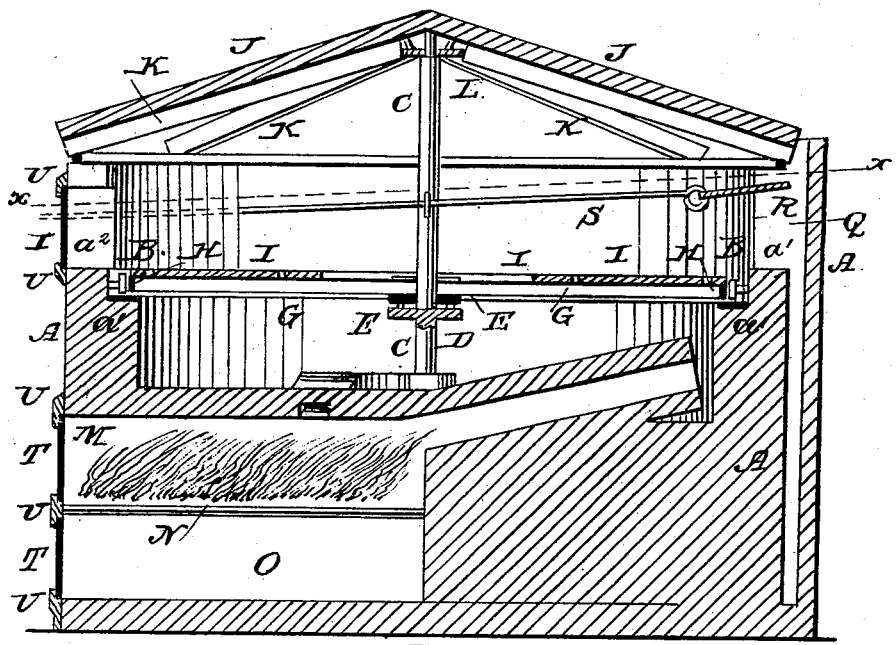
Figure 1 is a vertical section of my improved oven, taken through the line $y\ y$, fig. 2.

The wall A is made with a shoulder or off-set, $a'$, at a suitable distance below its top, as shown in fig. 1.

The shoulder $a'$ may be plated with iron, to form a smooth way for the wheels B, and thus diminish friction.

Figure 2:
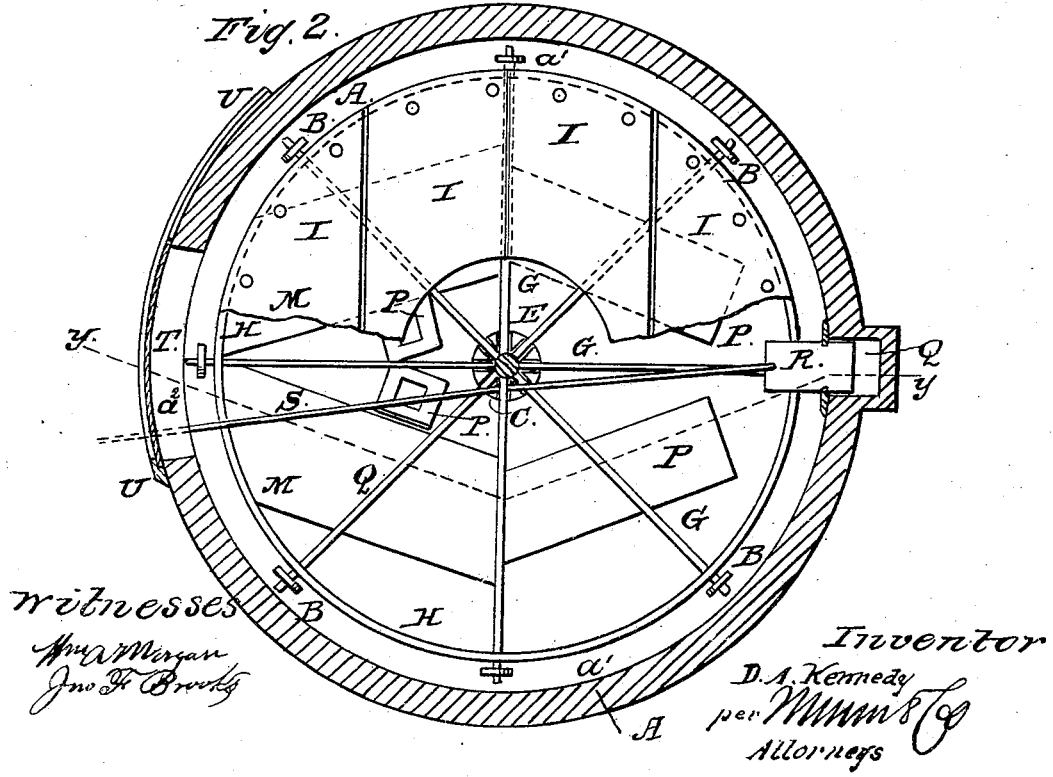
Figure 2 is a horizontal section of the same, taken through the line $x\ x$, fig. 1, part of the rotating platform being broken away.

C is vertical shaft, firmly and securely secured in place in the centre of the oven, as shown in figs. 1 and 2.

To the shaft C, a little below the horizontal plane of the shoulder $a'$, is firmly attached a collar, D, having a circular groove formed upon its upper side or face.

E is a collar, placed and revolving loosely upon the shaft C, and which has a circular groove formed in its lower side, corresponding in form and position with the groove in the stationary collar D.

F are balls, placed between the collars D and E, in the grooves in said collars, to diminish the friction caused by the revolution of the collar E.

The upper side of the collar E is grooved or channelled radially, to receive the inner ends of the radial arms G, which extend out to the shoulder $a'$, and have journals formed upon their outer ends to receive the wheels B, which roll along the said shoulder $a'$.

The outer ends of the radial arms G are kept in their proper relative positions by being attached to a ring, rim, or band, H, as shown in figs. 1 and 2.

I is the oven-plate or bottom, which is made in sections, as shown in fig. 2, and is securely attached to the arms G, so as to be carried around with said arms.

Holes may be formed in the plate I, near its outer edge, to receive an iron hook or handle, for revolving platform or oven-bottom, when desired.

The middle part of the plate I is cut away, as shown in figs. 1 and 2, to allow the heat to circulate freely through the open part of the oven.

J is the arched roof of the oven, which rests upon the radial rafters K, the outer ends of which are supported by the wall A, and the inner ends of which are connected with the collar L, placed upon and supported by the central vertical shaft C, as shown in fig. 1. This construction allows the arched roof to be made flatter than is possible when the arch is made wholly self-supporting.

M are the fire-chambers;

N are the grates; and

O are the ash-pits;

The fire-chambers M are diverging, and are each made with two or more diverging flues, P, so as to introduce the heat equally into all parts of the oven, thus insuring its being heated evenly.

The fire-arches should be covered with earth to the top of the flues P, to retain the heat and insure its equal distribution.

Q is the chimney-flue, the draught through which is regulated or entirely stopped, as desired, by the damper R, to which is attached a rod, S, passing out at the front of the oven, for convenience in operating the said damper.

The ash-pits O, fire-chambers M, and oven-opening $a^2$ are all provided with door T, which slide in groove in the iron frames U, which are laid in the wall A of the oven.

Having thus described my invention,

I claim as new, and desire to secure by Letters Patent—

1. The stationary grooved collar D, friction-balls F, revolving grooved collar E, radial arms G, rim H, and plate I, in combination with each other, and with the stationary central shaft C and shoulder $a^1$ of the wall A, substantially as herein shown and described, and for the purpose set forth.

2. The combination of the friction-wheels or rollers B with the arms G and rim H, either or both, and shoulder $a^1$ of the wall A, substantially as herein shown and described, for the purpose set forth.

D. A. KENNEDY.

Witnesses:
O. H. GILBERT,
J. L. SUTHERLAND.